No. 882,615. PATENTED MAR. 24, 1908.
F. W. BLECKLEY.
VEHICLE REACH.
APPLICATION FILED MAY 29, 1907.
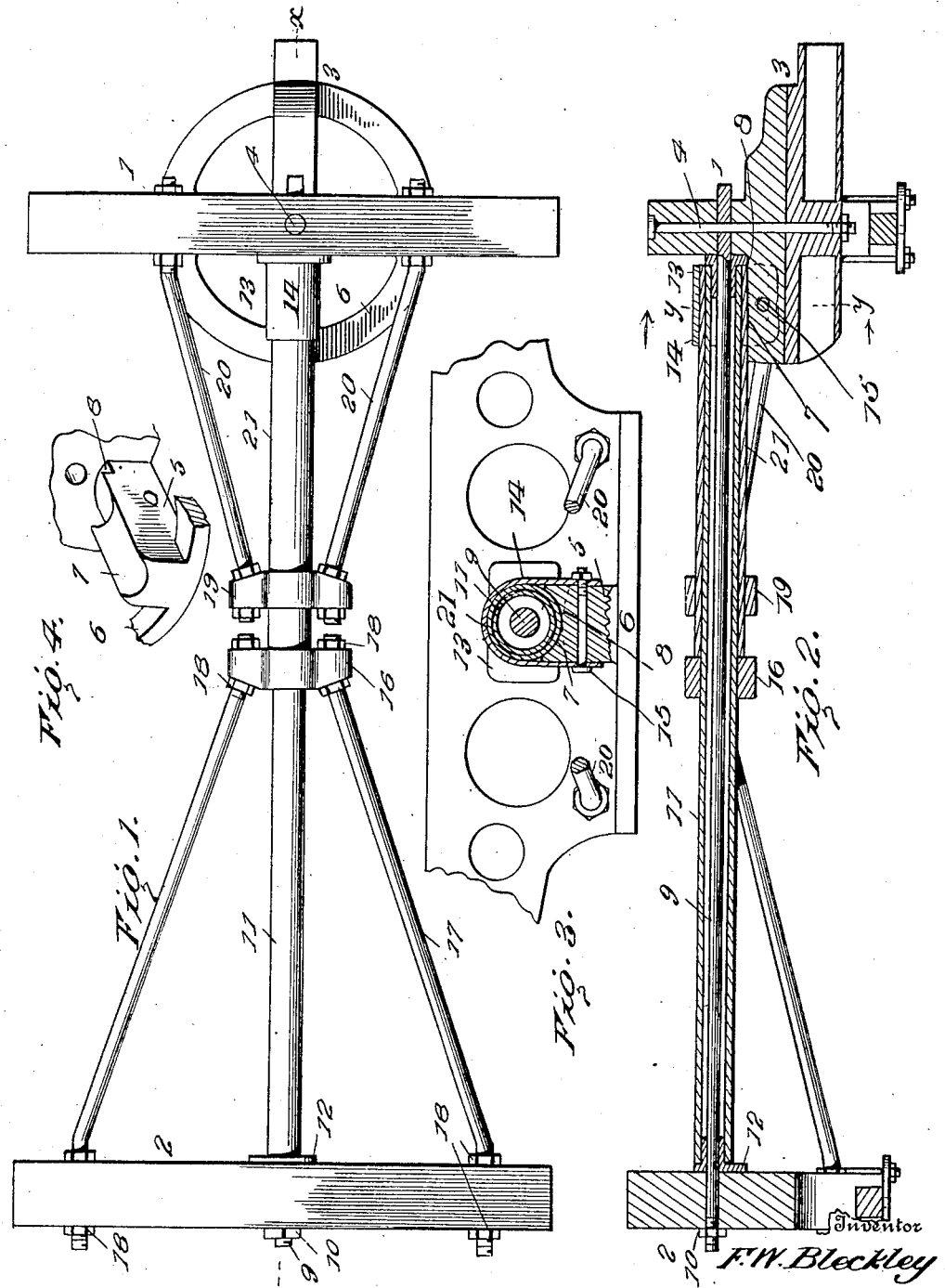

UNITED STATES PATENT OFFICE.

FREDERICK W. BLECKLEY, OF HAZLETON, PENNSYLVANIA.

VEHICLE-REACH.

No. 882,615.    Specification of Letters Patent.    Patented March 24, 1908.

Application filed May 29, 1907. Serial No. 376,341.

To all whom it may concern:

Be it known that I, FREDERICK W. BLECKLEY, citizen of the United States, residing at Hazleton, in the county of Luzerne and State of Pennsylvania, have invented certain new and useful Improvements in Vehicle Reaches or Couplings, of which the following is a specification.

The present invention provides novel means for connecting the fore and hind gears of vehicles, whereby the strain and jar incident to pulling or backing, or to the shifting of the load when ascending or descending grade, or to variation in height of one side or the other of the road, or to the dropping of wheels in a rut, or their passage over obstructions are equalized, or compensated for without wrenching or disabling the parts.

The invention consists of novel features, details of construction and combination of parts which hereinafter will be more particularly set forth, illustrated and finally claimed.

In the accompanying drawings forming a part of the specification: Figure 1 is a top plan view of coupling means for connecting the fore and hind gears of a vehicle embodying the invention. Fig. 2 is a vertical longitudinal section on the line $x$—$x$ of Fig. 1. Fig. 3 is a transverse section on the line $y$—$y$ of Fig. 2 looking to the front as indicated by the arrows. Fig. 4 is a detail perspective view of a portion of the fore gear showing more clearly the pillow for the tubular member of the front stay.

Corresponding and like parts are referred to in the following description and indicated in all the views of the drawings by the same reference characters.

The fore gear is indicated at 1 and the hind gear at 2 and may be of any construction depending upon the style of running gear to which the invention is adapted. The bolster of the hind gear is of one piece, whereas the bolster of the fore gear comprises two members, the upper member being adapted to be secured to the body of the vehicle and the lower member to the axle, a fifth wheel 3 being interposed between the two members and connected by the king bolt 4. The members of the fifth wheel 3 are formed with the respective parts so as to turn therewith. A pillow 5 is provided in the rear of the upper member of the front bolster and connects it with the rear portion of the upper member 6 of the fifth wheel. This pillow is formed in its top side with a longitudinal depression 7 forming a seat and with a transverse groove 8 at the front end of the pillow and immediately in the rear of the upper member of the bolster.

The coupling means embody a rod 9 which passes through openings of the front and rear bolsters, the front end of the rod 9 being apertured to receive the king bolt 4 and the rear end being threaded to receive a set nut 10. This bar sustains a major portion of the pulling force. A tube 11 encircles the rod 9 and is provided at opposite ends with flanges 12 and 13. The flange 12 is bolted or otherwise secured to the hind gear whereas the flange 13 is connected with the fore gear in a manner to admit of the two gears having relative angular movement without producing strain so that the fore and hind gears may occupy different relative angular positions without subjecting the coupling means to torsional strain. The flange 13 fits in the transverse groove 8 and closes against the rear side of the upper member of the front bolster. Pulling strain upon the tube 11 is transferred to the flanges 12 and 13, thence directly to the respective gears. In the event of the team backing, the fore and hind gears are braced by the ends of the tube 11 abutting against the inner or opposing sides of the respective bolsters thereof. The flange 13 is held in engagement with the groove 8 by means of a clip 14 which embraces opposite sides of the pillow 5 to which it is secured by a bolt or fastening 15.

Front and rear stays are provided and are of similar construction. The rear stay consists of a collar or yoke 16 and braces 17, the latter being rearwardly diverged and connected to the rear bolster near its lower edge. The collar or yoke 16 is fast to the tube 11 and the braces 17 have their end portions passed through openings in said collar or yoke and the rear bolster and are provided with pairs of set nuts 18 to admit of relative adjustment of the parts when assembling the elements. The front stay consists of a collar or yoke 19, braces 20 and a tube 21. The collar or yoke 19 is fast to the tube 21 and the stays 20 have adjustable connection with said collar or yoke and with the upper member of the front bolster. The front end of the tube 21 is fitted in the depression or seat 7 and is held in place by means of the clip 14. The front end of the tube 11 is journaled within the tube 21 so as to prevent any appreciable play, hence the flange 13 thereof is retained in place in the groove 8 by means of the clip 14 through the intervention of the tube 21. The front end of the tube 21 abuts against the rear side of the flange 13, whereas its rear end abuts against the front side of the collar or yoke 16. The front and rear stays besides preventing the outer ends of the fore and hind gears from inward movement, also brace said gears when the load shifts or when the vehicle is backing or strikes a curb or other chock. The braces 20 are forwardly diverged. The braces 17 and 20 incline downwardly from their inner ends with the result that their outer ends are in a lower plane with the lower portions of the gears so as to prevent inward displacement thereof when the vehicle is backed or suddenly stopped by impact by a curb or chock.

The rod 9, in addition to its function of connecting the front and hind gears, also serves to take up all wear on the flanges 12 and 13. It is also noted that the flange 13, in conjunction with the pillow 5, constitutes a stop to prevent the front bolster from turning completely when box is not used. The flange 13 and the transverse groove 8 may be such as to limit the play of the bolster, so that it may rise or fall a predetermined distance without producing any strain upon the coupling, thereby allowing for the passage of one wheel over an obstruction, or the drop of said wheel into a rut or depression. When the bolster turns to the limit provided by the play between the flange 13 and the bottom of the groove 8, the strain is distributed uniformly throughout the running gear, thereby obviating disabling of the same. If provision were not made for limiting the turning movement of the bolster it would not be practical to use flexible coupling on a cut under type of gearing without a box, for when the front gear was turned at right angles with the hind gear, it would turn on the tube 11 as an axis, which would be highly objectionable.

Having thus described the invention, what is claimed as new is:

1. In combination with fore and hind gears of a vehicle, a rod passed through openings in said gears, a king bolt connecting the front end of the rod with the fore gear, a set nut threaded upon the rear end of the rod and engaging with the rear side of the hind gear, a tube mounted upon said rod and abutting against the inner or opposing sides of said fore and hind gears and having positive connection at its rear end with the hind gear and connected by a swivel joint at its front end with the fore gear, and front and rear stays between the respective fore and hind gears and the said tube, each of the stays being of similar construction and comprising a collar and diverged braces.

2. In combination with the fore and hind gears of a vehicle, the fore gear having a pillow formed with a seat and an intersecting transverse groove, coupling means between said gears and abutting at its ends against the inner or opposing sides thereof, said coupling means having positive connection at its rear end with the hind gear and a swivel connection at its front end with the fore gear, said swivel connection being formed by a flange at the front end of the coupling means fitting the said transverse groove of the aforementioned pillow.

3. In combination with the fore and hind gears of a vehicle, the fore gear having a pillow formed with a seat and an intersecting transverse groove, coupling means between said gears and abutting at its ends against the inner or opposing sides thereof, said coupling means having positive connection at its rear end with the hind gear and a swivel connection at its front end with the fore gear, said swivel connection being formed by a flange at the front end of the coupling means fitting the said transverse groove of the aforementioned pillow, and similarly formed front and rear stays having their inner ends abutting and their outer ends connected to the respective gears, each of said stays embodying a collar and braces extended from the collar upon divergent lines and having positive connection with a gear.

4. In combination, fore and hind gears, a rod having king bolt connection with the fore gear and screw thread connection with the hind gear, a tube mounted upon the rod and having its ends abutting against the inner or opposing sides of the said gears and having positive connection at one end with the hind gear and swivel connection at its opposite end with the fore gear, a collar fast to said tube, rearwardly diverged braces connecting said collar with the outer lower portions of the hind gear, a tube mounted upon the coupling tube and abutting at its rear end against the said collar and at its front end with a flange at the front end of the said coupling tube, a collar fast to said tube and forwardly diverged, stays connecting the collar with the outer lower portions of the upper member of the fore gear.

5. In combination, fore and hind gears, the fore gear comprising upper and lower members having a fifth wheel connection between them and the upper member having a pillow formed in its top side with a longitudinal seat and with a transverse groove, a rod having king bolt connection with an upper member of the fore gear and having its rear end threaded and passed through an opening of the hind gear and receiving a set nut, a tube mounted upon the rod and flanged at opposite ends, one flange being secured to the hind gear and the other flange engaging a transverse groove of the pillow of the fore gear, and front and rear stays of similar construction, the rear stay embodying a yoke and rearwardly diverged braces, and the front stay embodying a tube, yoke and forwardly diverged braces, the braces of the stays being connected to the outer lower portions of the respective gears.

In testimony whereof I affix my signature in presence of two witnesses.

FREDERICK W. BLECKLEY. [L. S.]

Witnesses:
 JOHN WILHELM,
 E. D. BLECKLEY.